(12) United States Patent
Tsai et al.

(10) Patent No.: US 8,666,986 B2
(45) Date of Patent: Mar. 4, 2014

(54) GRID-BASED DATA CLUSTERING METHOD

(75) Inventors: Cheng-Fa Tsai, Pingtung (TW);
Yung-Ching Hu, Pingtung (TW)

(73) Assignee: National Pingtung University of Science & Technology, Pingtung County (TW)

(*) Notice: Subject to any disclaimer, the term of this patent is extended or adjusted under 35 U.S.C. 154(b) by 120 days.

(21) Appl. No.: 13/453,408

(22) Filed: Apr. 23, 2012

(65) Prior Publication Data

US 2012/0296904 A1 Nov. 22, 2012

(30) Foreign Application Priority Data

May 17, 2011 (TW) .............................. 100117244 A

(51) Int. Cl.
*G06N 5/00* (2006.01)
*G06F 17/30* (2006.01)

(52) U.S. Cl.
USPC ............................................ 707/737; 706/45

(58) Field of Classification Search
USPC .................... 706/45; 707/737, 776
See application file for complete search history.

(56) References Cited

U.S. PATENT DOCUMENTS

| | | | |
|---|---|---|---|
| 7,174,344 B2 | 2/2007 | Campos et al. | |
| 7,359,913 B1 * | 4/2008 | Ordonez | 1/1 |
| 7,565,346 B2 * | 7/2009 | Fan et al. | 1/1 |
| 7,584,159 B1 | 9/2009 | Chakrabarti et al. | |
| 7,590,642 B2 | 9/2009 | Campos et al. | |
| 7,853,542 B2 | 12/2010 | Tsai et al. | |
| 8,438,162 B2 * | 5/2013 | King et al. | 707/737 |

OTHER PUBLICATIONS

Berkhin, A Survey of Clustering Data Mining Techniques, 2006, Springer, pp. 25-71.*
Berkhin et al., Knowledge Discovery: Clustering, 2009, Springer, pp. 5051-5064.*
Kriegel et al., Clustering High-Dimensional Data: A Survey on Subspace Clustering, Pattern-Based Clustering, and Correlation Clustering, Mar. 2009, ACM Transactions on Knowledge Discovery from Data, vol. 3, No. 1, Article 1, pp. 1-58.*

* cited by examiner

*Primary Examiner* — Jorge A Casanova
(74) *Attorney, Agent, or Firm* — Muncy, Geissler, Olds & Lowe, P.C.

(57) ABSTRACT

A grid-based data clustering method is disclosed. A parameter setting step sets a grid parameter and a threshold parameter. A diving step divides a space having a plurality of data points according to the grid parameter. A categorizing step determines whether a number of the data points contained in each grid is larger than or equal to a value of the threshold parameter. The grid is categorized as a valid grid if the number of the data points contained therein is larger than or equal to the value of the threshold parameter, and the grid is categorized as an invalid grid if the number of the data points contained therein is smaller than the value of the threshold parameter. The clustering step retrieves one of the valid grids. If the retrieved valid grid is not yet clustered, the clustering step performs horizontal and vertical searching/merging operations on the valid grid.

4 Claims, 10 Drawing Sheets

GRID-BASED DATA CLUSTERING METHOD

BACKGROUND OF THE INVENTION

1. Field of the Invention

The present invention generally relates to a data clustering method and, more particularly, to a grid-based data clustering method.

2. Description of the Related Art

Data mining allows a user to dig out useful information from an original data having a plurality of data sets, so as to find out implicit characteristics and relations among the plurality of data sets. Based on the characteristics and relations, a completed data analysis model can be established. The data analysis model can be used in a variety of fields such as business behavior analysis, spatial data analysis, document managements, internet invasion analysis and so on. Therefore, potentially important information can be discovered for decision makers to reference. Data mining includes data clustering methods that allow a user to quickly recognize intrinsic correlations among the plurality of data, such as consumers' purchasing behavior and age-based market segmentation. Conceptually, data clustering is a mechanism that clusters those data having a high similarity to each other based on customized dimensional characteristics.

However, as the needs in diverse services and larger amounts of implicit information continue to grow, the ability to process an excessively large amount of data has become an important factor in evaluating the performance of the data clustering methods. The following representative conventional data clustering methods are described below.

A. DBSCAN data clustering method. In a first step of the method, one of a plurality of data points contained in a data set is randomly selected as an initial seed. In a second step, it is determined whether the quantity of the data points contained in a circular coverage, which is expanded from the initial seed in a radius, is larger than a threshold value. If so, all data points contained in the circular coverage are clustered as the same cluster. Then, these data points are taken as seeds. The same expansion operation of the initial seed is performed on each of the seeds. In a third step, the second step is repeatedly performed until all data points in the data set are clustered. Since the method proceeds data clustering based on density of the data points, the method can filter noise data points (the data points with low density) and can be applied to data points with an irregular pattern. However, it also takes considerable time to perform the method as each data point requires the same expansion operation and density determination, leading to long execution times.

B. IDBSCAN data clustering method. The method was proposed by B. Borah et al. in 2004, and aims at solving the problem of large time consumption of the DBSCAN data clustering method, which is caused by repeated determination and expansion operations of the seeds, by reducing the number of times of the required data inquiries. The method evenly creates 8 boundary symbols on a circumference of a circular coverage expanded from a seed in the radius. In the circular coverage, there is always a data point that is closest to a given boundary symbol. In total, 8 closest data points can be determined for the 8 boundary symbols. The method only selects the 8 data points as seeds to reduce the quantity of seeds. As such, the number of times the expansion operation is executed can be reduced. Thus, the problem of large time consumption of the DBSCAN data clustering method can be overcome. However, the amount of time saved is still limited.

C. GOD-CS data clustering method. The method is a grid-based data clustering method proposed by Tsai, C. F. and Chiu, C. S. in 2010. The method defines the grids as high-density grids and low-density grids in order to filter the noise data points. Then, a high-density grid is selected so that an expansion operation of the selected grid can be performed based on 8 surrounding grids of the selected grid. More specifically, the method sets parameters regarding grid size and tolerance value as criteria of density determination. Then, the space containing the data points is divided into a plurality of grids based on the grid size. The density of each grid is determined according to the tolerance value. When the quantity of the data points contained in a grid is larger than the tolerance value, the grid is regarded as a high-density grid. To the contrary, when the quantity of the data points contained in a grid is smaller than the tolerance value, the grid is regarded as a low-density grid. In a next step, a high-density grid is selected so that an expansion operation can be performed according to 8 surrounding grids of the high-density grid. In a final step, a low-density grid is selected to determine whether at least 5 out of the 8 grids surrounding the low-density grid are high-density grids. If so, the low-density grid is regarded as a high-density grid. If not, the low-density grid is regarded as a noise grid. In such a manner, accuracy of the data clustering method can be improved. However, the method requires the search for way many grids, leading to low performance.

In light of the problems, it is necessary to improve the conventional data clustering methods.

SUMMARY OF THE INVENTION

It is therefore the objective of this invention to provide a data clustering method with lower time consumption, thereby improving the clustering accuracy.

The invention discloses a grid-based data clustering method performed by a computer system, comprising a parameter setting step, a diving step, a categorizing step and a clustering step. The parameter setting step sets a grid parameter and a threshold parameter. The diving step divides a two-dimensional space having a plurality of data points into a plurality of grids according to the grid parameter, wherein the plurality of grids is in the form of a matrix. The categorizing step determines whether a number of the data points contained in each grid is larger than or equal to a value of the threshold parameter. The grid is categorized as a valid grid if the number of the data points contained in the grid is larger than or equal to the value of the threshold parameter, and the grid is categorized as an invalid grid if the number of the data points contained in the grid is smaller than the value of the threshold parameter. The clustering step retrieves one of the valid grids and determines whether the retrieved valid grid is clustered. If the retrieved valid grid is not yet clustered, the clustering step performs a horizontal searching/merging operation on the retrieved valid grid by searching at least one of the plurality of grids located on left and right sides of the retrieved valid grid for one or more of the valid grids. The grid or grids found are merged with the retrieved valid grid as a cluster if the grid or grids found are valid grids. The horizontal searching/merging operation is terminated when the invalid grid or a boundary grid of the matrix is found on both the left and right sides of the retrieved valid grid. The clustering step further adds the valid grids of the cluster to a seed list and retrieves the valid grids in the seed list. The clustering step further performs a vertical searching/merging operation on each of the valid grids retrieved from the seed list by searching at least one of the plurality of grids located above and below the retrieved valid grid for one or more of the valid grids. The grid or grids found are merged into the cluster if the grid or grids found are valid grids. The vertical searching/merging operation is terminated when the invalid grid or a boundary grid of the matrix above and below the retrieved valid grid is found.

Furthermore, the invention discloses a grid-based data clustering method performed by a computer system, comprising a parameter setting step, a diving step, a categorizing step and a clustering step. The parameter setting step sets a grid parameter and a threshold parameter. The diving step divides a two-dimensional space having a plurality of data points into a plurality of grids according to the grid parameter, wherein the plurality of grids is in the form of a matrix. The categorizing step determines whether a number of the data points contained in each grid is larger than or equal to a value of the threshold parameter. The grid is categorized as a valid grid if the number of the data points contained in the grid is larger than or equal to the value of the threshold parameter, and the grid is categorized as an invalid grid if the number of the data points contained in the grid is smaller than the value of the threshold parameter. The clustering step retrieves one of the valid grids and determines whether the retrieved valid grid is clustered. If the retrieved valid grid is not yet clustered, the clustering step performs a vertical searching/merging operation on the retrieved valid grid by searching at least one of the plurality of grids located above and below the retrieved valid grid for one or more of the valid grids. The grid or grids found are merged with the retrieved valid grid as a cluster if the grid or grids found are valid grids, and the vertical searching/merging operation is terminated when the invalid grid or a boundary grid of the matrix above and below the retrieved valid grid is found. The clustering step further adds the valid grids of the cluster to a seed list and retrieves the valid grids in the seed list. The clustering step further performs a horizontal searching/merging operation on each of the valid grids retrieved from the seed list by searching at least one of the plurality of grids located on left and right sides of the retrieved valid grid for one or more of the valid grids. The grid or grids found are merged into the cluster if the grid or grids found are valid grids. The horizontal searching/merging operation is terminated when the invalid grid or a boundary grid of the matrix is found on both the left and right sides of the retrieved valid grid.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
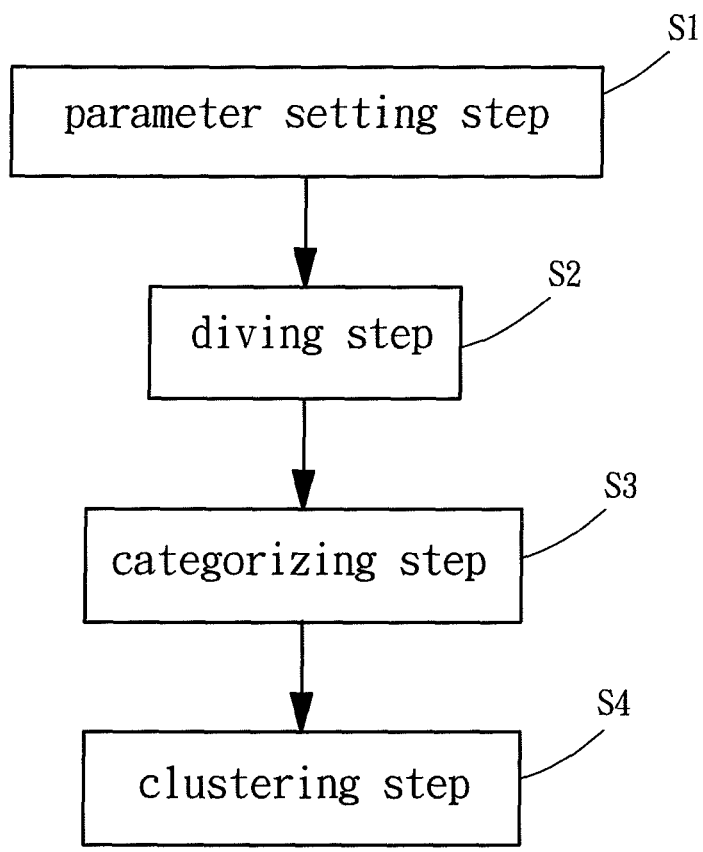
FIG. 1 shows a flowchart of a data clustering method according to a first embodiment of the invention.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
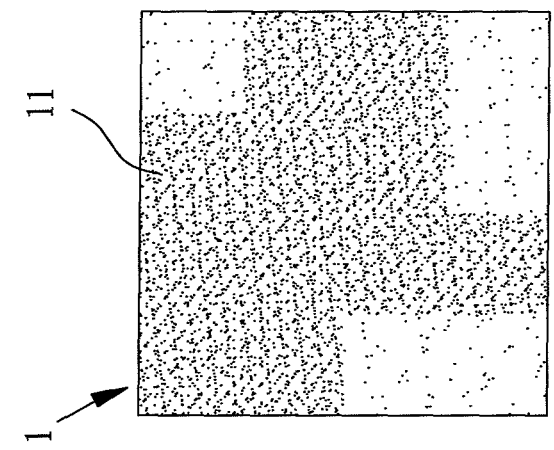
FIG. 2 shows a parameter setting step of the data clustering method of the first embodiment of the invention.

Referring to FIGS. 1 and 2, the proposed grid-based data clustering method is performed by a computer system connected to at least one database having a data set 1. In this embodiment, the data set 1 consists of a plurality of data points 11 distributed in a two-dimensional space. The method comprises a parameter setting step S1, a diving step S2, a categorizing step S3 and a clustering step S4 according to a first embodiment of the invention. Based on the steps S1 to S4, the invention can accurately perform clustering operation on the data points 11.

Referring to FIGS. 1 and 2 again, the parameter setting step S1 in the first embodiment is configured to set a grid parameter and a threshold parameter by a user. The value of the grid parameter determines the time consumption of the proposed method. The larger number of grids the space is divided into, the longer period of time it takes to perform the data clustering operations. The value of the threshold parameter can be changed based on the user need and data type of the database. The value of the grid parameter is preferably inversely proportional to that of the threshold parameter. Namely, the value of the threshold parameter is larger when the value of the grid parameter is smaller, and the value of the threshold parameter is smaller when the value of the grid parameter is larger. As such, inaccurate clustering results of the data points 11 that are caused by improper parameter settings can be avoided.

Figure 3:
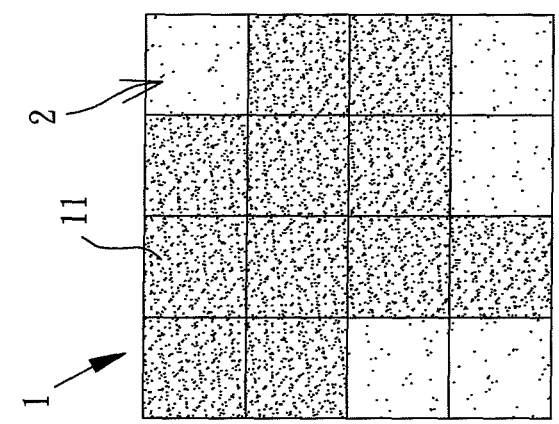
FIG. 3 shows a diving step of the data clustering method of the first embodiment of the invention.

Referring to FIGS. 1 to 3, the diving step S2 in the first embodiment is configured to divide the two-dimensional space having the data points 11 into a plurality of grids 2. The grid parameter determines the size of a two-dimensional matrix into which the space is divided. As an example, the space is divided into a metric having a size of 100 by 100 when the value of the grid parameter is set as 100. Therefore, each data point 11 is belonged to a certain grid 2. The information regarding the quantity of data points 11 contained in each grid 2 will be required in the categorizing step S3.

Figure 4:
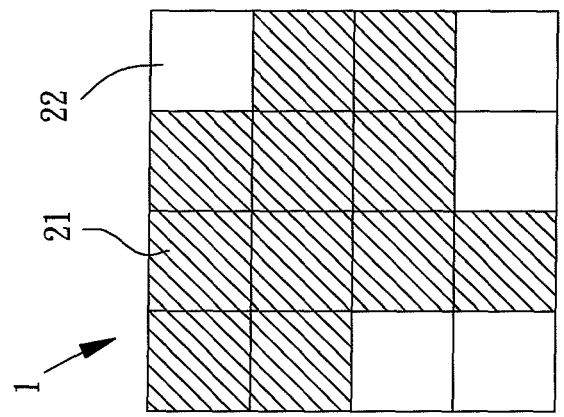
FIG. 4 shows a categorizing step of the data clustering method of the first embodiment of the invention.

Referring to FIGS. 1 and 4, the categorizing step S3 in the first embodiment is configured to category the grids 2 into valid grids 21 and invalid grids 22. Specifically, the space containing the grids 2 can be divided into the plurality of grids 2 after the diving step S2 is performed. Then, the quantity of the data points 11 contained in individual grid 2 is determined. When the quantity of the data points 11 contained in a grid 2 is larger than or equal to the value of the threshold parameter, the grid 2 is regarded as a valid grid 21. To the contrary, when the quantity of the data points 11 contained in a grid 2 is smaller than the value of the threshold parameter, the grid 2 is regarded as an invalid grid 22. The data points 11 contained in the invalid grid 2 are so called "noise data points".

Figure 5:
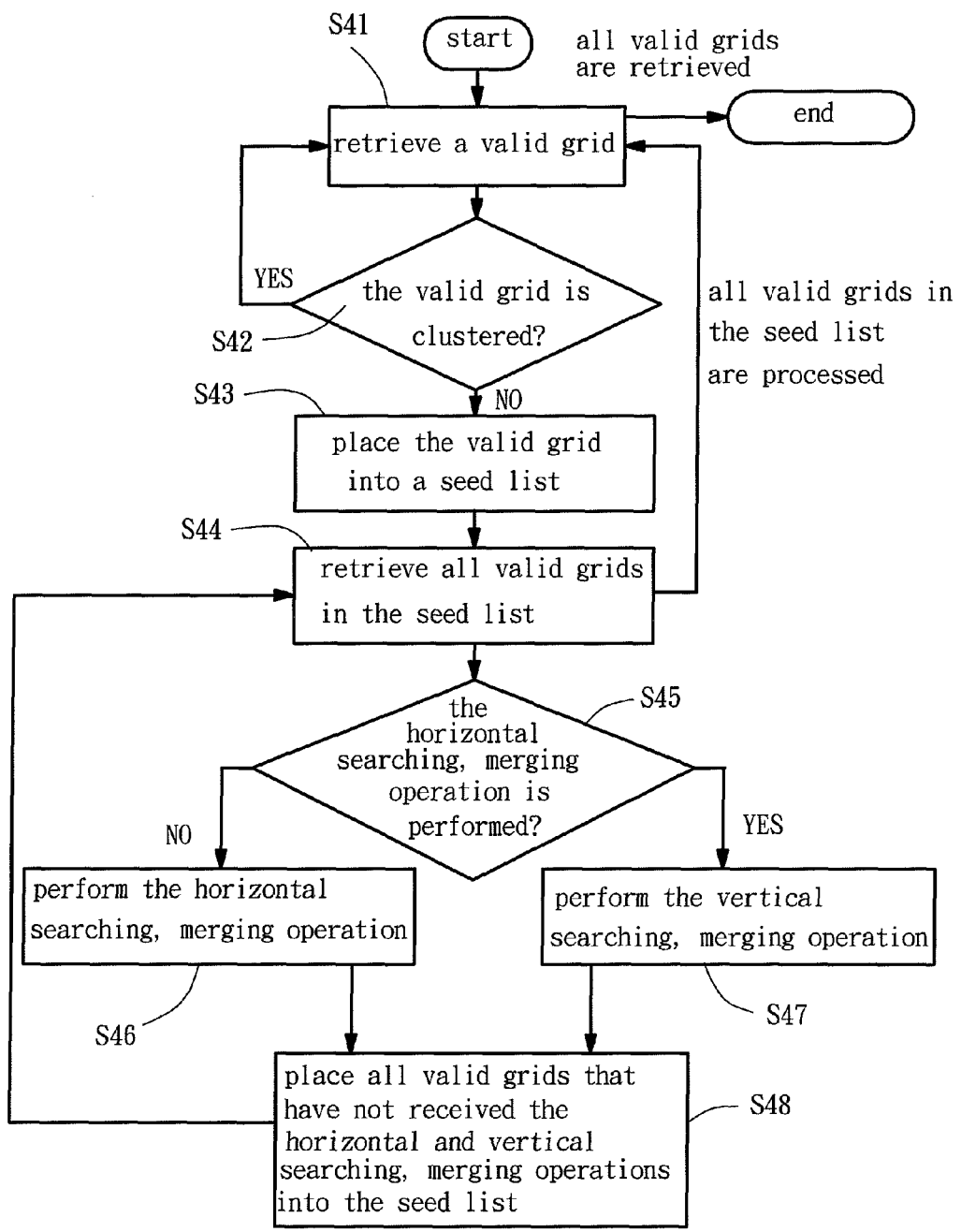
FIG. 5 shows a detailed flowchart of a clustering step of the data clustering method of the first embodiment of the invention.

Referring to FIGS. 1, 4 and 5, the clustering step S4 in the first embodiment is configured to retrieve all valid grids 21 in order to determine whether the valid grids 21 are clustered. If the retrieved valid grid 21 is already clustered, the next valid grid 21 is retrieved to determine the same result. If the retrieved valid grid 21 is not yet clustered, the retrieved valid grid 21 is added to a seed list. Then, a horizontal searching/merging operation is performed on the valid grid 21. The horizontal searching/merging operation is initiated at a given valid grid 21 (which is called "starting valid grid 2" hereinafter), searching to the left and right sides of the starting valid grid 21 for continuous valid grids 21 until an invalid grid 22 is found. The valid grids 21 found during the horizontal searching/merging operation are regarded as being in the same cluster with the starting valid grid 21. It is noted that all valid grids 21 found are deemed as having undergone the horizontal searching/merging operation, and will be added to the seed list thereafter. Then, a vertical searching/merging operation is performed on each valid grid 21 in the seed list. The vertical searching/merging operation is also initiated at a valid grid 21 (starting valid grid 2). In the vertical searching/merging operation, one grid 2 above and below the starting valid grid 2 are searched, so as to determine whether there exist any valid grids 21. The valid grid(s) 21 found will be regarded as being in the same cluster with the starting valid grid 21. If the starting valid grid 21 is the uppermost grid 2 having no grid 2 located thereon, then only one grid 2 below the starting valid grid 21 is searched. Similarly, if the starting valid grid 21 is the lowermost grid 2 having no grid 2 located below, only one grid 2 above the starting valid grid 21 is searched. In this manner, the valid grid 21(s) found is also added to the seed list. The clustering operation is finished after both the horizontal and vertical searching/merging operations are performed on all valid grids 21. The clustering step S4 may preferably consists of a plurality of sub-steps, as shown in FIG. 5.

Figures 6A, 6B, 6C:
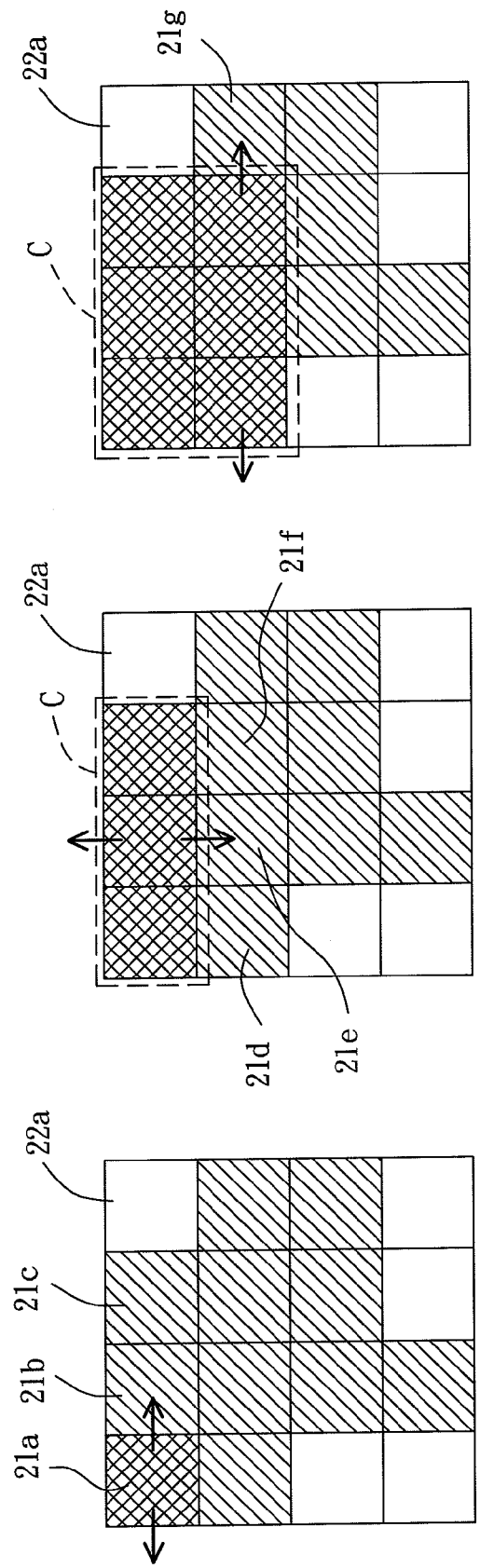
FIGS. 6a-6g show continuous clustering operations of the first embodiment of the invention.
Figure 6E:
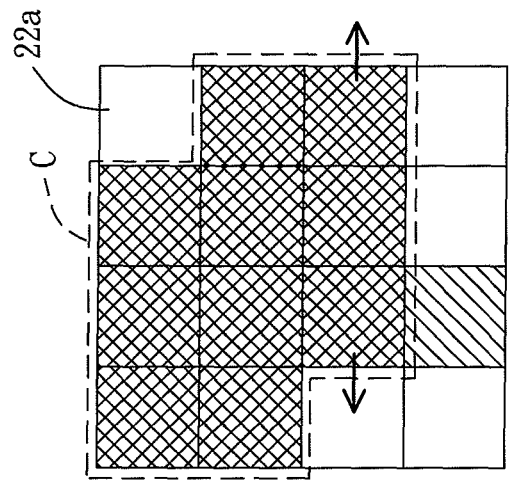
Figure 6D:
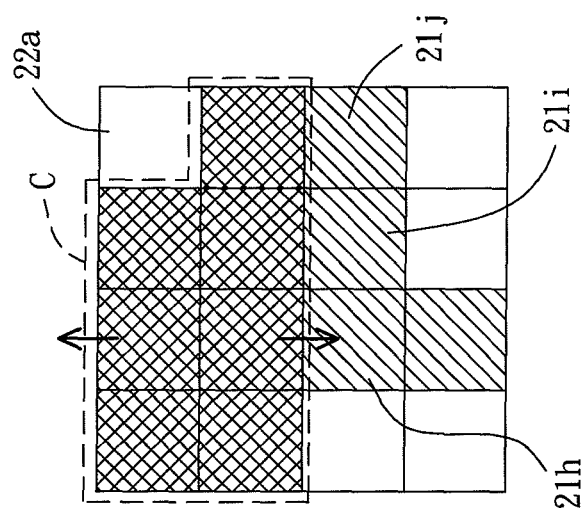
Figure 6F:
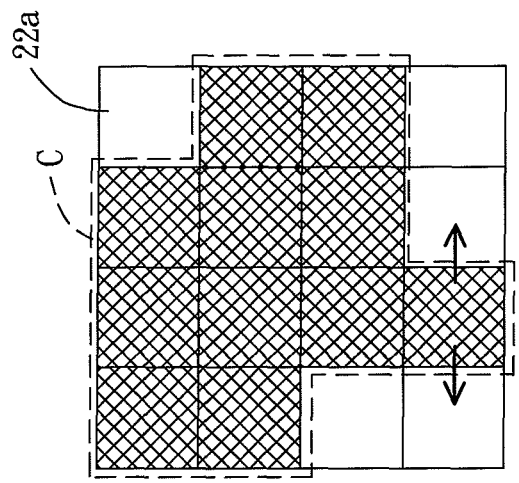

As shown in FIGS. 5 and 6a, the clustering step S4 comprises a sub-step S41 configured to retrieve a valid grid 21. Only one valid grid 21 is retrieved each time the sub-step S41 is performed. During performance of the proposed method, the retrieval order of the valid grids 21 is not limited. As an example, the valid grids 21 can be retrieved from left to right or from top to bottom as indicated in the first embodiment. The clustering step S4 is finished after all valid grids 21 are retrieved. As shown in FIG. 6a, the starting valid grid 21 is the grid 21a.

As shown in FIGS. 5 and 6a, the clustering step S4 comprises a sub-step S42 configured to determine whether the currently retrieved valid grid 21 is clustered? If so, the procedure goes back to the sub-step S41, retrieving a next valid grid 21. If not, the procedure goes on. As shown in FIG. 6a in the first embodiment, it is shown that the valid grid 21a is not yet clustered.

As shown in FIGS. 5 and 6a, the clustering step S4 comprises a sub-step S43 configured to add the currently retrieved valid grid 21 to a seed list if the valid grid 21 is not yet clustered. As shown in FIG. 6a in the first embodiment, the valid grid 21a is not yet clustered and will be added to the seed list.

As shown in FIGS. 5 and 6a, the clustering step S4 comprises a sub-step S44 configured to retrieve all valid grids 21 in the seed list. In the sub-step S44, if all valid grids 21 in the seed list are processed, the procedure goes back to the sub-step S41 to retrieve a next valid grid 21. In the sub-step S41, if all valid grids 21 are retrieved, the clustering step S4 is finished. To the contrary, in the sub-step S44, if there are any valid grids 21 in the seed list that are not processed, the procedure goes on. As shown in FIG. 6a in the first embodiment, since it is shown that the valid grid 21a is not yet clustered, the procedure goes on.

As shown in FIGS. 5 and 6a, the clustering step S4 comprises a sub-step S45 configured to determine whether the valid grids 21 in the seed list have undergone the horizontal searching/merging operation. If not, the procedure goes to a next sub-step S46. If so, the procedure goes to a next sub-step S47. As shown in FIG. 6a in the first embodiment, it is shown that the valid grid 21a has not yet undergone the horizontal searching/merging operation.

As shown in FIGS. 5 and 6a, the clustering step S4 comprises the sub-step S46 configured to perform the horizontal searching/merging operation on the valid grid 21 that has not yet undergone the horizontal searching/merging operation. The horizontal searching/merging operation is initiated at the valid grid 21, searching to the left and right sides of the starting valid grid 21 for all continuous valid grids 21 until an invalid grid 22 or a boundary grid 2 is found. The valid grids 21 found are clustered together as a cluster C. The procedure goes on. As shown in FIGS. 6a and 6b in the first embodiment, it is shown that the valid grid 21a has not yet undergone the horizontal searching/merging operation. Therefore, the horizontal searching/merging operation is initiated at the valid grid 21a, searching to the left and right sides of the valid grid 21a for all continuous valid grids 21. Since there is no grid 2 on the left side of the valid grid 21a, no grid 2 is found on the left side. At the same time, the horizontal searching/merging operation is terminated at a grid 22a since the grid 22a is an invalid grid 22a. There are two valid grids 21b and 21c found on the right side of the valid grid 21a. Therefore, the horizontal searching/merging operation of the valid grid 21a clusters the valid grids 21a, 21b and 21c together as the cluster C. The procedure goes on.

As shown in FIGS. 5, 6a, 6b and 6c, the clustering step S4 comprises the sub-step S47 configured to perform the vertical searching/merging operation on the valid grid 21 that has already undergone the horizontal searching/merging operation. In the vertical searching/merging operation, there is no limit to which quantity of grids 22 the vertical searching/merging operation may search upwards and downwards. In the first embodiment of the invention, the vertical searching/merging operation searches one grid 2 up and down (two grids 2 in total) at a starting valid grid 21. If the starting valid grid 21 is a boundary grid, only one grid 2 is searched. Also, the valid grid(s) 21 found are clustered with the starting valid grid 21 as the same cluster C. The procedure goes on. As shown in FIGS. 6a, 6b and 6c in the first embodiment, it is shown that all the retrieved valid grids 21a, 21b and 21c have already undergone the horizontal searching/merging operation, and therefore are clustered together as the same cluster C. Then, the vertical searching/merging operation is performed on the cluster C of the valid grids 21a, 21b and 21c, searching one grid 2 above and below the cluster C as disclosed in the first embodiment. As shown in FIGS. 6b and 6c, when the vertical searching/merging operation is initiated at the cluster C consisting of the valid grids 21a, 21b and 21c, no grid can be found above, and the valid grids 21d, 21e and 21f are found below. Thus, the valid grids 21d, 21e and 21f are merged into the cluster C and therefore are regarded as being in the same cluster with the valid grids 21a, 21b and 21c. The procedure goes on.

As shown in FIGS. 5 and 6b, the clustering step S4 comprises the sub-step S48 configured to add all valid grids 21 that have not yet undergone both the horizontal and vertical searching/merging operations to the seed list. Then, the procedure goes back to the sub-step S44. As shown in FIG. 6b in the first embodiment, it is shown that the valid grids 21a, 21b and 21c already undergone the horizontal searching/merging operation but do not undergo the vertical searching/merging operation yet. Therefore, the valid grids 21a, 21b and 21c are added to the seed list. The procedure goes back to the sub-step S44.

Specifically, to elaborate the clustering step S4 of the first embodiment, the clustering step S4 is described with continuous operations shown in FIGS. 6a, 6b and 6c. Referring to FIGS. 6a, 6b and 6c again, when the sub-step S41 retrieves a valid grid 21a, the sub-step S42 determines whether the valid grid 21a is clustered? If the determination is negative, the procedure goes to the sub-step S43, adding the valid grid 21a to the seed list. Then, the procedure goes to the sub-step S44 to retrieve the valid grid(s) 21 in the seed list. Then, the sub-step S45 determines whether the retrieved valid grid(s) 21 has undergone the horizontal searching/merging operation. If not, the procedure goes to the sub-step S46, performing the horizontal searching/merging operation on the retrieved valid grid(s) 21. In FIG. 6a, two valid grids 21b and 21c are found. Thus, the valid grids 21a, 21b and 21c are clustered together as the same cluster C. Then, the procedure goes to the sub-step S48 to add the valid grids 21a, 21b and 21c that have already undergone the horizontal searching/merging operation but have not yet undergone the vertical searching/merging operation to the seed list. Then, the procedure goes back to the sub-step S44 to retrieve the valid grids 21a, 21b and 21c. Since the valid grids 21a, 21b and 21c have already undergone the horizontal searching/merging operation, the sub-step S47 performs the vertical searching/merging operation on the cluster C of the valid grids 21a, 21b and 21c. In the first embodiment, the vertical searching/merging operation searches one grid 2 above and below a starting valid grid 21. At this point, the valid grids 21d, 21e and 21f are found. The valid grids 21d, 21e and 21f found are regarded as being in the same cluster of the valid grids 21a, 21b and 21c. Upon entry of the sub-step S48, since the valid grids 21a, 21b and 21c have already undergone both the horizontal and vertical searching/merging operations, only the valid grids 21d, 21e and 21f that have not yet undergone the vertical searching/merging operation are added to the seed list. The procedure goes back to the sub-step S44.

Figure 6G:
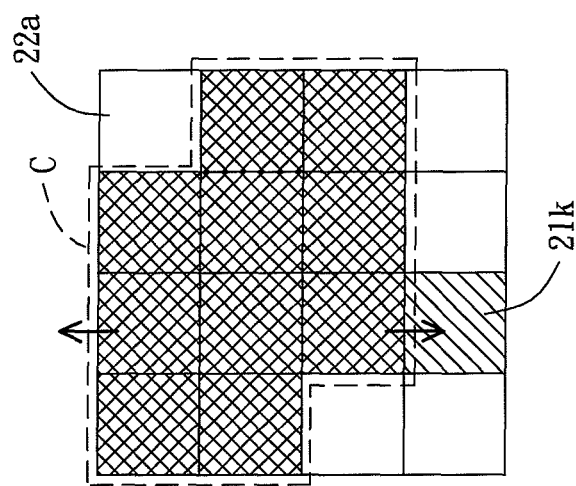

Referring to FIGS. 5, 6c, 6d, 6e, 6f and 6g, upon entry of the sub-step S44, the valid grids 21d, 21e and 21f are retrieved. Since the sub-step S45 determines that the valid grids 21d, 21e and 21f have not yet undergone the horizontal searching/merging operation, the sub-step S46 performs the horizontal searching/merging operation on the valid grids 21d, 21e and 21f, as shown in FIG. 6c. At this point, the valid grid 21g is found and merged into the cluster C. The horizontal searching/merging operation is terminated at the valid grid 21g because the valid grid 21g is a boundary grid. Then, the procedure goes to the sub-step S48, adding the valid grids 21d into 21g that have not yet undergone the vertical searching/merging operation to the seed list. The procedure goes back to the sub-step S44, retrieving the valid grids 21d to 21g in the seed list. Then, since the sub-step S45 determines that the valid grids 21d, 21e, 21f and 21g have already undergone the horizontal searching/merging operation, the procedure goes to the sub-step S47, performing the vertical searching/merging operation on the valid grids 21d to 21g. At this point, the valid grids 21h to 21j are found and merged into the cluster C of the valid grids 21a to 21g. The procedure goes to the sub-step S48, adding the valid grids 21h to 21j that have not yet undergone the horizontal searching/merging operation to the seed list. Then, the procedure goes back to the sub-step S44, retrieving the valid grids 21h to 21j in the seed list. Then, since the sub-step S45 determines that the valid grids 21h to 21j have already undergone the vertical searching/merging operation, the procedure goes to the sub-step S46, performing the horizontal searching/merging operation on the valid grids 21h to 21j. At this point, no valid grid is found. The procedure goes to the sub-step S48, adding the valid grids 21h to 21j that have not yet undergone the vertical searching/merging operation to the seed list. Then, the procedure goes back to the sub-step S44, retrieving the valid grids 21h to 21j in the seed list. Then, since the sub-step S45 determines that the valid grids 21h to 21j have already undergone the horizontal searching/merging operation, the procedure goes to the sub-step S47, performing the vertical searching/merging operation on the valid grids 21h to 21j. At this point, the valid grid 21k is found and merged into the cluster C of the valid grids 21a to 21j. The procedure goes to the sub-step S48. As shown in FIG. 6g, since all valid grids 21 in the seed list have already undergone both the horizontal and vertical searching/merging operations, the procedure goes back to the sub-step S41. In the sub-step S41, if all valid grids 21 are retrieved, the clustering step S4 is finished. At this time, the clustering operation of the data points 11 is completed.

Figure 7:
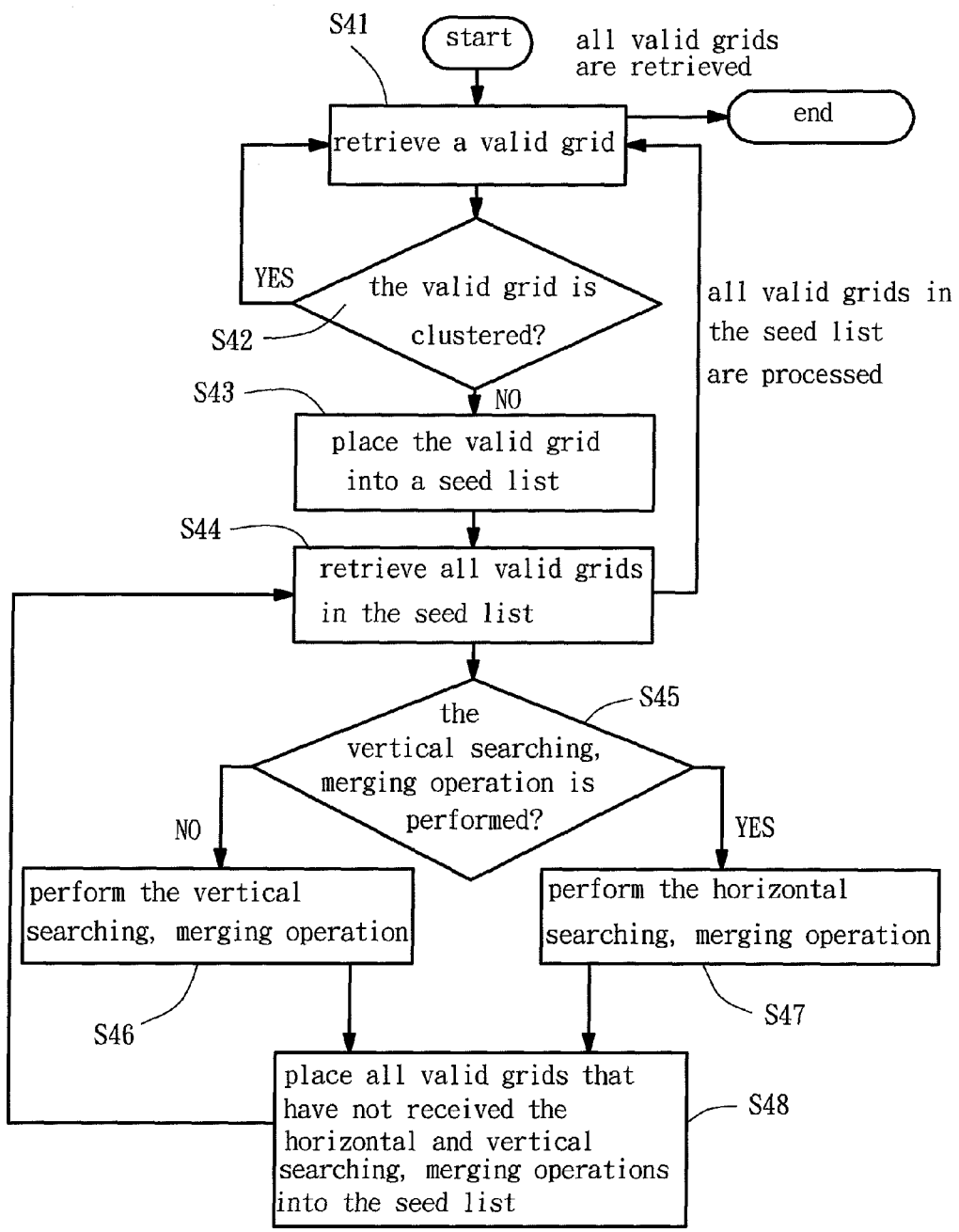
FIG. 7 shows a detailed flowchart of a clustering step of a data clustering method according to a second embodiment of the invention.

Referring to FIGS. 1 and 7, the proposed method comprises a parameter setting step S1, a diving step S2, a categorizing step S3 and a clustering step S4 according to a second embodiment of the invention. The parameter setting step S1, the diving step S2, the categorizing step S3, as well as the sub-steps S41, S42, S43, S44 and S48 of the clustering step S4 in this embodiment, are similar to those in the first embodiment. Therefore, similar steps are not described herein again for brevity.

Figure 8A:
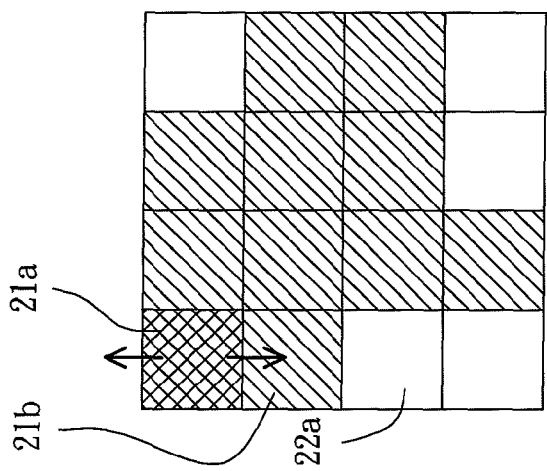
FIGS. 8a-8g show continuous clustering operations of the second embodiment of the invention.

Referring to FIGS. 7 and 8a, the sub-steps S45 in this embodiment is configured to determine whether all valid grids 21 added to the seed list have undergone the vertical searching/merging operation? If not, the procedure goes to the sub-step S46. If so, the procedure goes to the sub-step S47. In FIG. 8a, it is shown that the retrieved valid grid 21a has not yet undergone the vertical searching/merging operation.

Figure 8B:
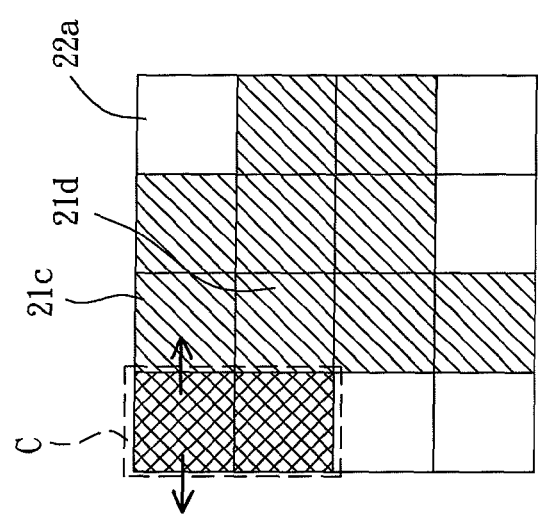

Referring to FIGS. 7, 8a and 8b, the sub-steps S46 in this embodiment is configured to perform the vertical searching/merging operation on the valid grid(s) 21 that has not yet undergone the vertical searching/merging operation. In this embodiment, the vertical searching/merging operation is initiated at a valid grid 21 (starting valid grid 2), searching for all continuous valid grids 21 located above and below the starting valid grid 21 until an invalid grid 22 or a boundary grid 2 is found. The valid grids 21 found are clustered together as a cluster C. The procedure goes to the sub-steps S48. In the FIGS. 8a and 8b of the second embodiment, it is shown that the valid grid 21a has not yet undergone the vertical searching/merging operation. Thus, the vertical searching/merging operation is performed on the valid grid 21a, searching for all continuous valid grids 21 located above and below the valid grids 21a. In the example of FIG. 8a, no valid grid 21 is located above the valid grids 21a (therefore no valid grid 21 is found), and only one valid grid 21b below the valid grid 21a is found as the next grid 2 further down is an invalid grid 22a. The valid grids 21a and 21b are clustered together as the same cluster C. The procedure goes to the sub-steps S48.

Figure 8C:
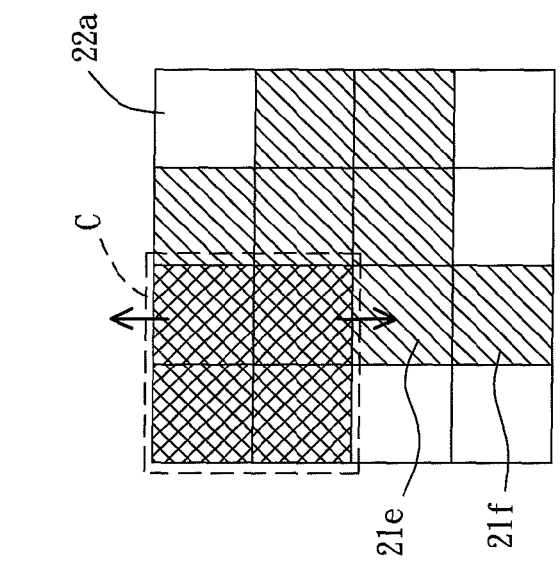
Figure 8E:
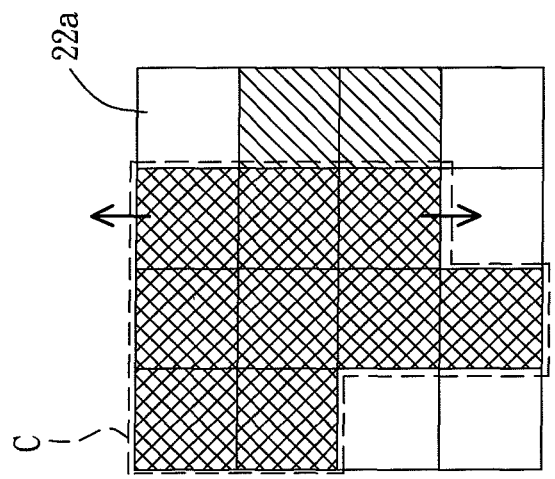
Figure 8D:
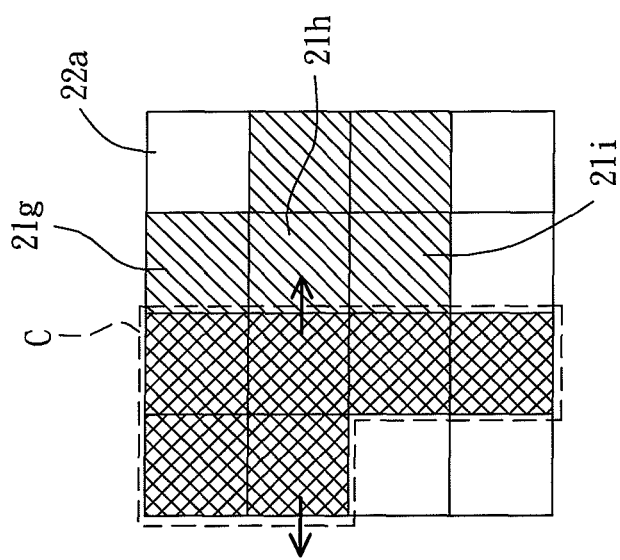

Referring to FIGS. 7, 8a, 8b and 8c, the sub-steps S47 in this embodiment is configured to perform the horizontal searching/merging operation on the valid grid(s) 21 that has undergone the vertical searching/merging operation but has not yet undergone the horizontal searching/merging operation. There is no limit to which quantity of grids the horizontal searching/merging operation can search leftwards or rightwards. In the second embodiment, only one grid 2 on the left and right sides of a starting valid grid 21 is searched. If the starting valid grid 21 is a boundary grid, only one grid 2 is searched. Also, the valid grid(s) 21 found are clustered with the starting valid grid 21 as the same cluster C. The procedure goes to the sub-steps S48. In FIGS. 8a, 8b and 8c of the second embodiment, it is shown that the valid grids 21a and 21b have already undergone the vertical searching/merging operation, and are clustered together as the same cluster C. Based on this, the horizontal searching/merging operation is performed on the valid grids 21a and 21b. In the horizontal searching/merging operation, one grid 2 on the left and right sides of the starting valid grid 21 are searched (two grids 2 in total). Referring to FIGS. 8b and 8c, no valid grid 21 is found on the left side (as there is no valid grid 21 on the left side of the valid grids 21c and 21d), and two valid grids 21c and 21d are found on the right side of the valid grids 21a and 21b. Thus, the valid grids 21c and 21d found are merged into the cluster C of the valid grids 21a and 21b, and therefore are regarded as being in the same cluster of the valid grids 21a and 21b. The procedure goes to the sub-steps S48.

Specifically, to elaborate the clustering step S4 of the invention, the clustering step S4 is described with continuous operations shown in FIGS. 7, 8a, 8b and 8c. Referring to FIGS. 7, 8a, 8b and 8c again, when the sub-step S41 retrieves a valid grid 21a, the sub-step S42 determines whether the valid grid 21a is clustered? If the determination is negative, the procedure goes to the sub-step S43, adding the currently-retrieved valid grid 21a to the seed list. Then, the procedure goes to the sub-step S44 to retrieve the valid grid 21 in the seed list. Then, the sub-step S45 determines whether the retrieved valid grid 21 has undergone the vertical searching/merging operation. If not, the procedure goes to the sub-step S46, performing the vertical searching/merging operation on the retrieved valid grid 21. In the example of FIG. 8a, the valid grid 21b is found by the vertical searching/merging operation. Thus, the valid grids 21a and 21b are clustered together as the same cluster C. Then, the procedure goes to the sub-step S48 to add the valid grids 21a and 21b that have already undergone the vertical searching/merging operation but have not yet undergone the vertical searching/merging operation to the seed list. Then, the procedure goes back to the sub-step S44 to retrieve all valid grids 21. Since the valid grids 21a and 21b have already undergone the vertical searching/merging operation, the sub-step S47 performs the horizontal searching/merging operation on each of the valid grids 21a and 21b. In the second embodiment of the invention, one grid 2 on the left and right sides are searched in the horizontal searching/merging operation. Therefore, the valid grids 21c and 21d are found. The valid grids 21c and 21d found are regarded as being in the same cluster of the valid grids 21a and 21b. Upon entry of the sub-step S48, since all the valid grids 21a and 21b have already undergone both the horizontal and vertical searching/merging operations, only the valid grids 21c and 21d that have not yet undergone the vertical searching/merging operation are added to the seed list. The procedure goes back to the sub-step S44.

Figure 8G:
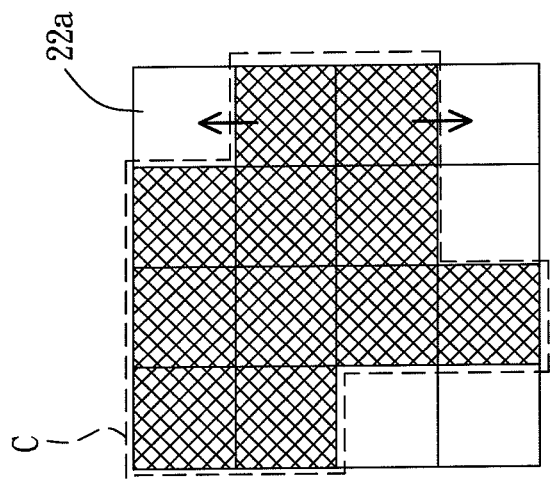
Figure 8F:
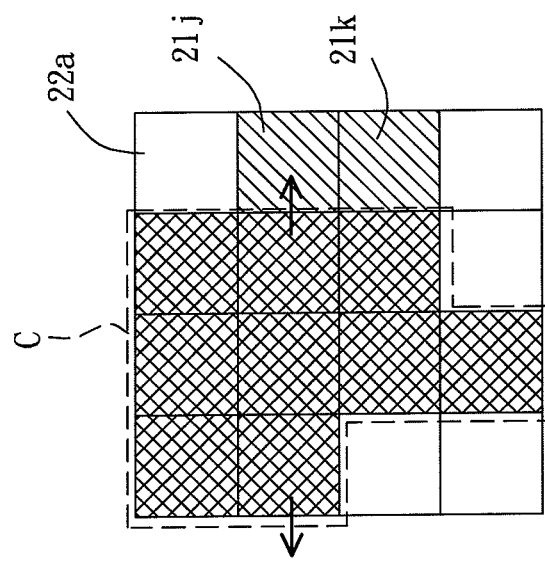

Referring to FIGS. 7, 8c, 8d, 8e, 8f and 8g, upon entry of the sub-step S44, the valid grids 21c and 21d are retrieved. Since the sub-step S45 determines that the valid grids 21c and 21d have already undergone the horizontal searching/merging operation, the procedure goes to the sub-step S46, performing the vertical searching/merging operation on the valid grids 21c and 21d, as shown in FIG. 8c. At this point, the valid grids 21e and 21f are found and merged into the cluster C. The vertical searching/merging operation is terminated at the valid grid 21f because the valid grid 21f is a boundary grid. Then, the procedure goes to the sub-step S48, adding the valid grids 21c to 21f that have not yet undergone the horizontal searching/merging operation to the seed list. The procedure goes back to the sub-step S44, retrieving the valid grids 21c to 21f in the seed list. Then, since the sub-step S45 determines that the valid grids 21c to 21f have already undergone the vertical searching/merging operation, the procedure goes to the sub-step S46, performing the horizontal searching/merging operation on the valid grids 21c to 21f. At this point, the valid grids 21g to 21i are found and merged into the cluster C of the valid grids 21a to 21f. The procedure goes to the sub-step S48, adding the valid grids 21g to 21i that have not yet undergone the vertical searching/merging operation to the seed list. Then, the procedure goes back to the sub-step S44, retrieving the valid grids 21g to 21i in the seed list. Then, since the sub-step S45 determines that the valid grids 21g to 21i have not yet undergone the vertical searching/merging operation, the procedure goes to the sub-step S47, performing the vertical searching/merging operation on the valid grids 21g to 21i. Then, the procedure goes to the sub-step S48, adding the valid grids 21g to 21i that have not yet undergone the horizontal searching/merging operation to the seed list. Then, the procedure goes back to the sub-step S44, retrieving the valid grids 21g to 21i in the seed list. Then, since the sub-step S45 determines that the valid grids 21g to 21i have already undergone the vertical searching/merging operation, the procedure goes to the sub-step S46, performing the horizontal searching/merging operation on the valid grids 21g to 21i. At this point, the valid grid 21j and 21k are found and merged into the cluster C of the valid grids 21a to 21i. The procedure goes to the sub-step S48. As shown in FIG. 8g, since all valid grids 21 in the seed list have already undergone both the horizontal and vertical searching/merging operations, the procedure goes back to the sub-step S41. In the sub-step S41, if all valid grids 21 are retrieved, the clustering step S4 is finished. Thus, the clustering operation of the data points 11 is completed.

During the searching operation of the invention, the grids 2 with low density are regarded as invalid grids 22. In this manner, only the valid grids 2 with high density are searched, reducing the number of grids 2 searched. Therefore, the time consumption can be reduced. In contrast to the conventional data clustering method which requires the search for 8 surrounding grids of a retrieved grid, the invention simply searches the grids 2 located in horizontal and vertical directions of the retrieved grid 2, reducing the number of grids searched. In the invention, when the grids in a direction (such as the horizontal direction in the first embodiment) are searched, the valid grids 21 found are regarded as being in the same cluster C. Then, the grids in the other direction (such as the vertical direction in the first embodiment) are searched, and the valid grids 21 found are merged into the cluster C. Thus, data points 11 are searched and clustered at the same time. However, in the conventional data clustering method, a correlation table is created based on multi-directional searching. Then, a union of the valid grids 21 in the correlation table is taken, and the data clustering is performed. In other words, the correlations of the grids are recorded and determined before the clustering operation. In contrast, since the invention allows the searching and clustering operations to be performed at the same time, the invention can omit the recording procedure of the correlation information, thereby reducing the time consumption.

To prove the invention as being efficient in data clustering over the conventional methods, data sets 1 to 6 are provided for experimental purpose. The data clustering results of the invention are compared to those of the conventional IDB-SCAN, DBSCAN and GOD-CS methods. Each of the data sets 1 to 6 has 575,000 data points, including 75,000 noise data points. The data sets 1 to 6 have different distribution patterns from each other. The data set 1 has 10 clusters, the data set 2 has 5 clusters, the data set 3 has 4 clusters, the data set 4 has 2 clusters, the data set 5 has 4 clusters, and the data set 6 has 4 clusters. The experiment equipments are a Central Processing Unit (CPU) of 1.5 GHz (Intel Pentium 4) and a memory of 2 GB, with the computer program implemented by Java algorithm. The data sets 1 to 6 are listed in Table 1 with related information. The experiment parameters of the data sets 1 to 6 are listed in Table 2 below. The data sets 1 to 6 are clustered 10 times using the proposed method and conventional methods, and the average results are shown in Table 3 below.

TABLE 1

Tested Data Sets

| Data Item | Data Set 1 | Data Set 2 | Data Set 3 | Data Set 4 | Data Set 5 | Data Set 6 |
|---|---|---|---|---|---|---|
| Source | Tasi and Yen, 2007 | Tasi and Yen, 2007 | Tasi and Yen, 2007 | Tasi and Yen, 2007 | Tasi and Yen, 2007 | Tasi and Yen, 2007 |
| Quantity of Clusters | 10 | 5 | 4 | 2 | 4 | 4 |
| Total Number of Data Points | 575,000 | 575,000 | 575,000 | 575,000 | 575,000 | 575,000 |
| Total Number of Noise Points Included | 75,000 | 75,000 | 75,000 | 75,000 | 75,000 | 75,000 |

TABLE 2

Experimental Parameters

| Parameter | Data Set 1 | Data Set 2 | Data Set 3 | Data Set 4 | Data Set 5 | Data Set 6 |
|---|---|---|---|---|---|---|
| Total Number of Grids | 245 | 245 | 222 | 245 | 245 | 245 |
| Threshold | 12 | 14 | 12 | 12 | 12 | 12 |

TABLE 3

Simulation Results

| Algorithm | Item | Data Set 1 | Data Set 2 | Data Set 3 | Data Set 4 | Data Set 5 | Data Set 6 |
|---|---|---|---|---|---|---|---|
| IDBSCAN | Time (sec) | 3128 | 3289 | 3071 | 3274 | 3124 | 3282 |
|  | Accuracy in Data Clustering | 99.99% | 99.96% | 99.99% | 99.99% | 99.97% | 99.99% |
|  | Noise Filtering Rate | 95.24% | 94.25% | 94.33% | 95.46% | 93.37% | 94.16% |
| DBSCAN | Time (sec) | 14764 | 15072 | 15260 | 14987 | 15013 | 15039 |
|  | Accuracy in Data Clustering | 99.99% | 99.99% | 99.96% | 99.88% | 99.99% | 99.83% |
|  | Noise Filtering Rate | 94.22% | 94.86% | 95.56% | 94.21% | 91.3% | 93.39% |
| GOD-CS | Time (sec) | 0.330 | 0.351 | 0.342 | 0.367 | 0.351 | 0.359 |
|  | Accuracy in Data Clustering | 98.54% | 98.69% | 99.21% | 98.8% | 98.84% | 98.78% |
|  | Noise Filtering Rate | 99.43% | 99.55% | 95.56% | 99.84% | 99.68% | 99.63% |
| The Invention | Time (sec) | 0.053 | 0.051 | 0.049 | 0.047 | 0.051 | 0.048 |
|  | Accuracy in Data Clustering | 99.58% | 98.62% | 99.53% | 99.61% | 99.47% | 99.32% |
|  | Noise Filtering Rate | 98.78% | 99.61% | 99.24% | 99.28% | 99.24% | 99.24% |

Referring to table 3, the comparison results between the proposed method and the conventional methods show that the proposed method does provide high data clustering efficiency and high noise filtering rate over the conventional methods. Advantageously, the invention can significantly reduce the time consumption and provide high data clustering efficiency.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A grid-based data clustering method performed by a computer system, comprising:
    a parameter setting step setting a grid parameter and a threshold parameter;
    a diving step dividing a two-dimensional space having a plurality of data points into a plurality of grids according to the grid parameter, wherein the plurality of grids is in the form of a matrix;
    a categorizing step determining whether a number of the data points contained in each grid is larger than or equal to a value of the threshold parameter, wherein the grid is categorized as a valid grid if the number of the data points contained in the grid is larger than or equal to the value of the threshold parameter, and the grid is categorized as an invalid grid if the number of the data points contained in the grid is smaller than the value of the threshold parameter; and
    a clustering step, comprising:
        retrieving one of the valid grids and determining whether the retrieved valid grid is clustered;
        performing a horizontal searching, merging operation on the retrieved valid grid by searching at least one of the plurality of grids located on left and right sides of the retrieved valid grid for one or more of the valid grids if the retrieved valid grid is not yet clustered, wherein the grid or grids found are merged with the retrieved valid grid as a cluster if the grid or grids found are valid grids, and the horizontal searching/merging operation is terminated when the invalid grid or a boundary grid of the matrix is found on both the left and right sides of the retrieved valid grid;
        adding the valid grids of the cluster to a seed list;
        retrieving the valid grids in the seed list; and
        performing a vertical searching/merging operation on each of the valid grids retrieved from the seed list by searching at least one of the plurality of grids located above and below the retrieved valid grid for one or more of the valid grids, wherein the grid or grids found are merged into the cluster if the grid or grids found are valid grids, and the vertical searching/merging operation is terminated when the invalid grid or a boundary grid of the matrix above and below the retrieved valid grid is found.

2. The grid-based data clustering method performed by a computer system as claimed in claim 1, wherein the number of the plurality of grids searched during the vertical searching/merging operation is two in maximum.

3. A grid-based data clustering method performed by a computer system, comprising:
    a parameter setting step setting a grid parameter and a threshold parameter;
    a diving step dividing a two-dimensional space having a plurality of data points into a plurality of grids according to the grid parameter, wherein the plurality of grids is in the form of a matrix;
    a categorizing step determining whether a number of the data points contained in each grid is larger than or equal to a value of the threshold parameter, wherein the grid is categorized as a valid grid if the number of the data points contained in the grid is larger than or equal to the value of the threshold parameter, and the grid is categorized as an invalid grid if the number of the data points contained in the grid is smaller than the value of the threshold parameter; and
    a clustering step, comprising:
        retrieving one of the valid grids and determining whether the retrieved valid grid is clustered;
        performing a vertical searching/merging operation on the retrieved valid grid by searching at least one of the plurality of grids located above and below the retrieved valid grid for one or more of the valid grids if the retrieved valid grid is not yet clustered, wherein the grid or grids found are merged with the retrieved valid grid as a cluster if the grid or grids found are valid grids, and the vertical searching/merging operation is terminated when the invalid grid or a boundary grid of the matrix above and below the retrieved valid grid is found;
        adding the valid grids of the cluster to a seed list;
        retrieving the valid grids in the seed list; and
        performing a horizontal searching/merging operation on each of the valid grids retrieved from the seed list by searching at least one of the plurality of grids located on left and right sides of the retrieved valid grid for one or more of the valid grids, wherein the grid or grids found are merged into the cluster if the grid or grids found are valid grids, and the horizontal searching/merging operation is terminated when the invalid grid or a boundary grid of the matrix is found on both the left and right sides of the retrieved valid grid.

4. The grid-based data clustering method performed by a computer system as claimed in claim 3, wherein the number of the plurality of grids searched during the horizontal searching/merging operation is two in maximum.

* * * * *